INVENTORS:
LEONARD H. FLORY
HARRY L. NOLL

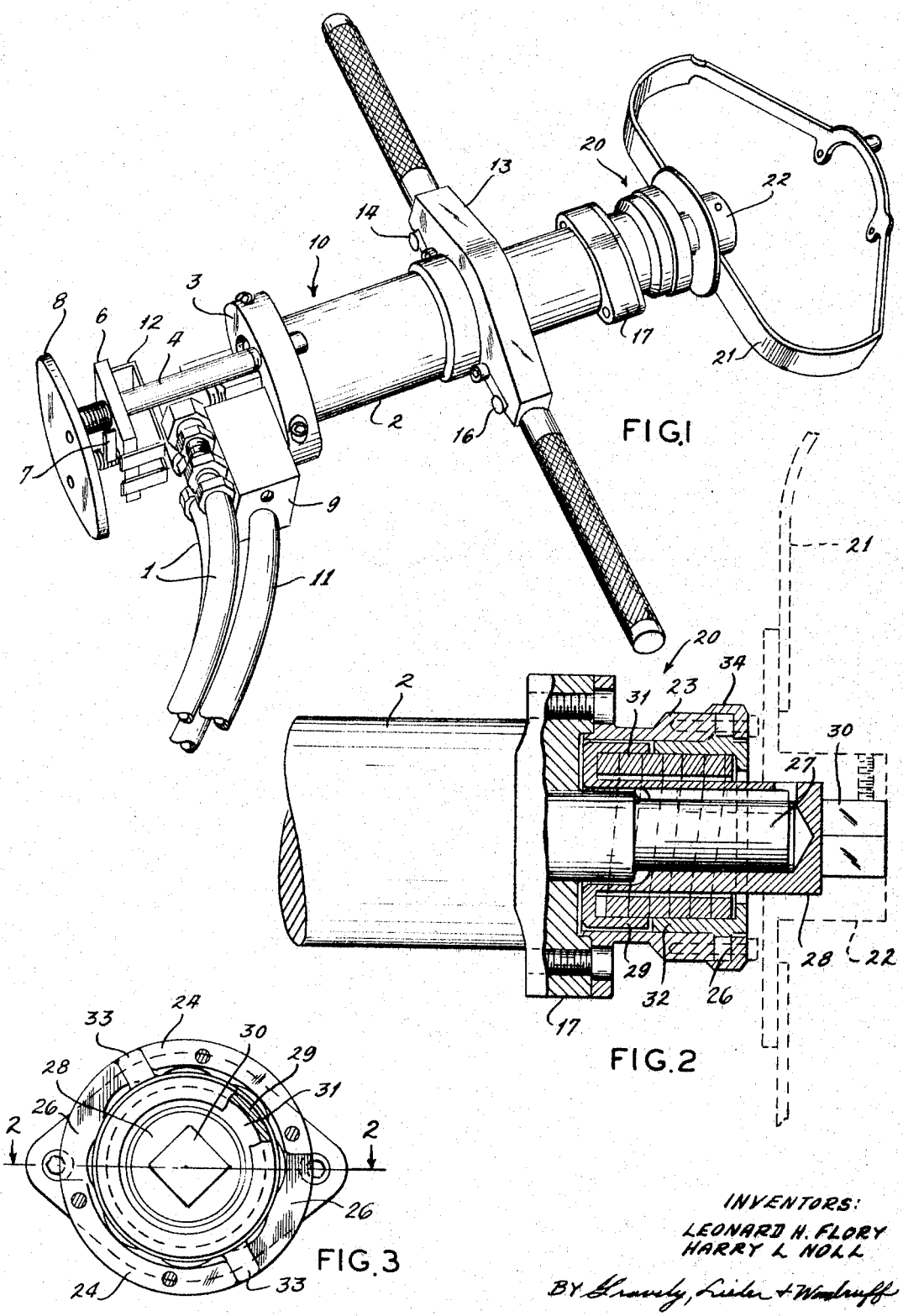

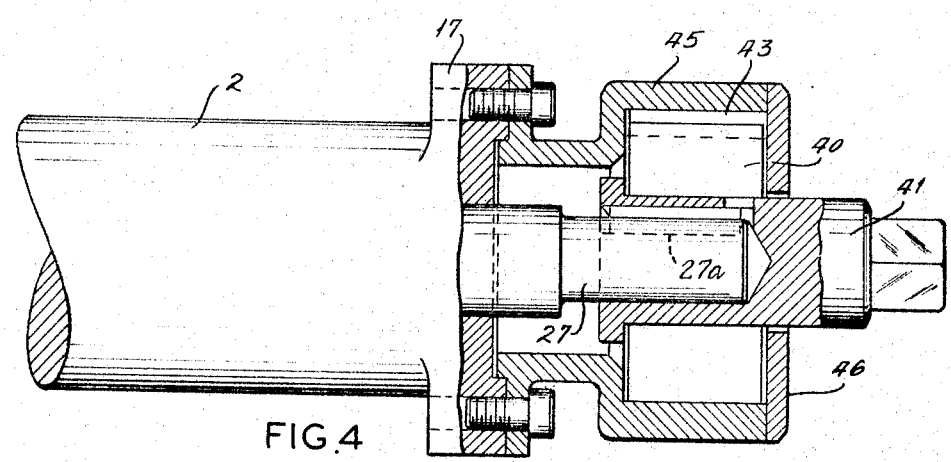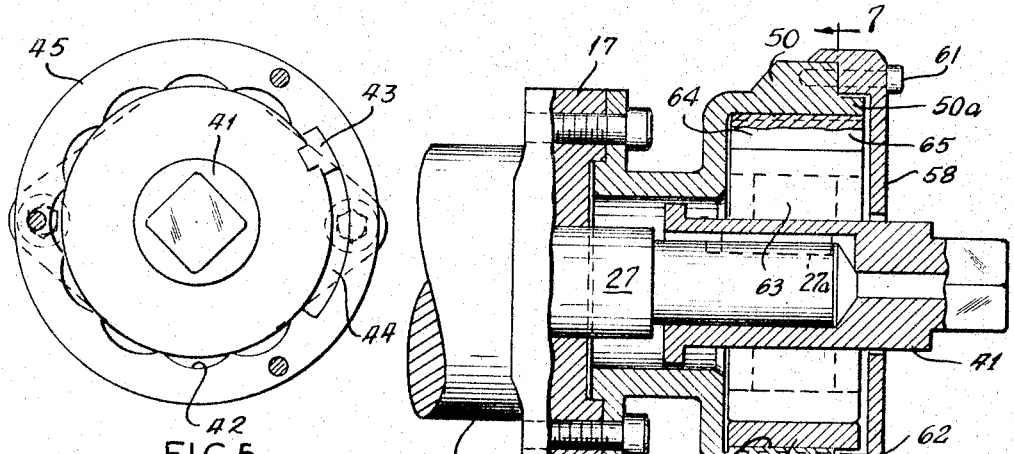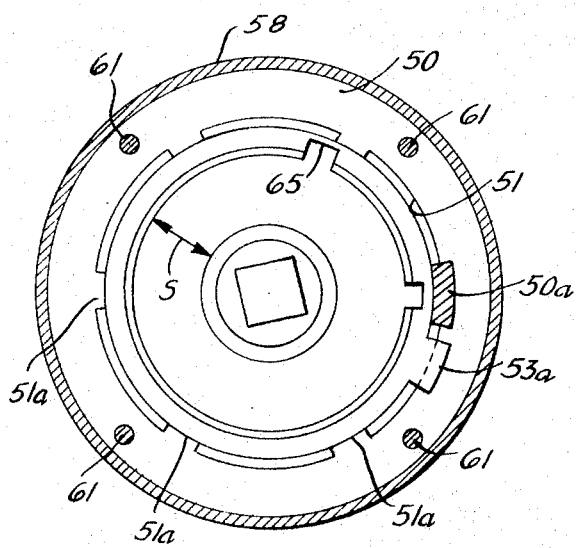

BY Gravely, Lieder & Woodruff

ATTORNEYS,

3,320,835
BEARING ADJUSTER TOOL

Leonard H. Flory and Harry L. Noll, both of Canton, Ohio, assignors to The Timken Roller Bearing Company, Canton, Ohio, a corporation of Ohio
Filed Oct. 19, 1964, Ser. No. 404,774
5 Claims. (Cl. 81—54)

The present invention relates to adjuster tools, and more particularly to special type wrenches, such as spanner wrenches, for adjusting wheel bearings.

In adjusting wheel bearings for semi-floating type passenger car or truck rear axles, controlled amount of running clearance (lateral looseness) is established by threaded adjusters. Achieving the appropriate degree of lateral looseness is difficult because of certain variables such as variation in thread fits, seating of bearings, displacement of the lubricant, interference of machined parts, etc. Likewise, the same problems are present in adjusting front wheel bearings.

The present invention overcomes these problems by affording rotation of the threaded adjuster to remove all lateral looseness and then automatically backing the adjuster a specific number of degrees to assure consistent lateral looseness. The invention may be applied to any application requiring the bearings to operate with running clearance.

Briefly, the basic tool appertaining to the invention consists of a commercially available two-way (forward and reverse) air motor developing preferably about 35 to 50 foot-pounds torque at slow r.p.m. for driving a clutch control wrench adapted to engage the bearing adjuster. The clutch may be a wrapped spring clutch or a commercially available shaped cam or sprag type overrunning (one-way) clutch.

The controlled degree of lateral looseness is afforded by the various clutch controls with positive reverse stops which allow untightening of the bearing adjuster to a predetermined degree.

It is therefore an important object of the invention to provide a bearing adjuster wrench which contains very few parts and may be operated by a conventional air motor utilizing limited reverse rotation to afford proper degree of lateral looseness.

It is another object of the invention to provide a bearing adjuster wrench which tightens bearings to remove all lateral looseness and then automatically increases lateral looseness to the desired degree.

It is another object of the invention to provide a tool with an overriding clutch and clutch control adapted to control a bearing adjuster wrench to remove lateral looseness from a bearing and then increase lateral looseness to a predetermined degree.

It is another object of the invention to provide a bearing adjuster tool having an air motor drive to operate an over-running clutch and a clutch control supported within a clutch housing for limiting rotation of the clutch control, and having a wrench drive coupled with the over-running clutch free to rotate in one direction to tighten a bearing removing all lateral looseness yet permitted to rotate only a limited degree in the other direction to provide a predetermined degree of lateral looseness as established by the clutch control.

It is a further object of the invention to provide a bearing adjuster tool operated by an air motor which utilizes a clutch housing and cover supporting a cam clutch assembled with a slight interference fit into a clutch adapter including an integral stop tang that is carried in one direction with the clutch until the stop tang engages a no load member while the clutch continues to allow operation of the adjuster wrench to remove all lateral looseness in a bearing and that is returned with the clutch in the other direction until the stop tang engages an impack tang in the clutch housing with the clutch stopping the adjuster wrench establishing a preselected degree of lateral looseness.

It is still a further object of the invention to provide a bearing adjuster tool operated by an air motor which includes a wrapped spring clutch arrangement inside a clutch control for affording operation of a bearing wrench in one direction wherein the spring frictionally engages the clutch control to rotate such control until it seats against a stop with the bearing wrench continuing to rotate and in the other direction wherein the spring seizes the clutch control rotating such control until it seats against another stop stalling the air motor.

These and other objects and advantages of the invention will be apparent from the ensuing detailed description and the appended claims in conjunction with the drawings wherein:

FIG. 1 is a perspective of the air driven bearing adjuster tool appertaining to the invention;

FIG. 2 is a part cross sectional view of the wrapped spring clutch for the adjuster tool;

FIG. 3 is an end view partly broken away with the clutch cover removed from the tool as depicted in FIG. 2;

FIG. 4 is a modified version in part cross section of the bearing adjuster using a cam clutch;

FIG. 5 is an end view of the version in FIG. 4 with the cover removed;

FIG. 6 is a part cross sectional view of the preferred embodiment of the invention;

FIG. 7 is an end view with the cover removed of the preferred embodiment depicted in FIG. 6;

Figure 10:
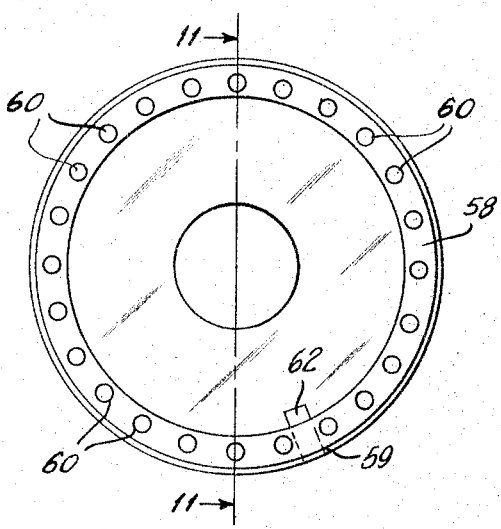
FIG. 10 is an end view of the clutch housing cover depicted in FIG. 6.

Briefly, this invention is directed to an air operated, manually controlled wrench which has reversably opreating mechanism which will develop, in one direction of rotation, a predetermined torque on a threaded element or its equivalent, and in the opposite direction will back off on the threaded element a predetermined amount. In the first mentioned direction of rotation the threaded member being driven by the wrench will tighten up and this will put a load on the air motor of the wrench to eventually stall out the motor. Before the motor stalls the spring clutch will permit slippage to occur. In the reverse direction it is the idea to utilize the wrench to unthread the threaded member to a predetermined angular position and when that position has been obtained, to positively stop the wrench motor. The amount of reverse rotation and the positive stopping of the motor in the wrench is under the control of an angular slot and a lug arranged between relatively movable parts of the wrench.

Referring to the drawings wherein like parts bear like numerals, the invention is described in detail. Now, with specific reference to FIGS. 1–3, the air driven wrench includes air motor, generally denoted 10, with associated supply hoses 1 connected through suitable couplings to the base end of the motor body 2. A support ring 3 is attached to motor body 2. Support ring 3 slidably receives a pair of tubular slides 4 which are slidably supported by a fixed plate 6 which is attached to the base end of the motor body 2 to support a safety switch 7. The outer ends of the slides 4 are secured to a push plate 8, and there are compression springs carried on the slide 4 between the push plate 8 and the support plate 6 so that the push plate 8 is constantly urged outwardly, thereby allowing the safety switch 7 to assume an off position. The switch 7, and other switches to be described, receive electric current in any suitable manner from a terminal box 9 mounted adjacent the support ring 3. The box 9 receives an electrical cable 11 for energizing the safety switch 7 as well as other switches. A shield 12 covers the electrical connections leading to safety switch 7. A handle 13 is attached to motor body 2 and carries within its structure a clockwise control switch 14 and counterclockwise control switch 16. A wrapped spring clutch assembly 20 is suitably secured to flange 17 of motor body 2 and the clutch supports a spanner wrench 21 held in place by retainer cap 22. To avoid confusion in FIG. 2, spanner wrench 21 is shown in phantom.

The clutch assembly is shown is FIGS. 2 and 3 and includes a clutch housing 23 which is suitably secured by threaded elements to the motor housing flange 17. The outer end of the clutch housing 23 is provided with an annular end face 24 which is interrupted by the arcuate notches or recesses 26. The recesses are diametrically opposed and include an arc of approximately 60° of the end face 24 (FIG. 3). The air motor drive shaft 27 projects through the flange 17 and is key connected to a wrench drive 28 which is formed with a spaced integral sleeve 29 at its inner end and with a square head 30 at its outer end. It can be seen that the drive 28 and the sleeve 29 form an annular recess, and one end of a square wire spring 31 is seated in the recess so as to have a moderate frictional engagement with the inner surface of the sleeve 29. The action of the spring 31 is controlled by a clutch control 32 which is rotatable in the housing 23 and surrounds a substantial portion of the spring 31 with a light frictional engagement. The clutch control 32 extends inwardly so that its inner end is closely adjacent the outer end of the sleeve 29, and as shown, the spacing between these two parts is less than the width of a turn of the square wire spring 31. As shown in FIG. 3 the clutch control 32 is provided with diametrically opposed ears 33 which are seated in the recesses 26 of the end face 24 of the clutch housing 23. Thus, the clutch control 32 has limited annular movement which is dictated by the ears 33 moving in the recesses 26 to the arcuate limits of the recesses. A cover plate 34 retains the operating parts above described in position.

In operation, the mechanic handling the present tool must use his body to depress the plunger 8 so as to actuate switch 7. This will energize the motor so that upon depressing control switch 14 the air motor 10 will be activated to rotate the drive shaft 27 and wrench drive 28 in a clockwise direction. This is so because as the shaft 27 rotates the drive 28 the frictional engagement between the turns of the spring 31 and the sleeve 29 and 32 will rotate the clutch control 32 in the same direction until the ears 33 (FIG. 3) reach one end of the notches 26. The amount of friction generated between the turns of the spring 31 and the inner surfaces of the clutch control 32 is sufficient, as noted, to bring the ears 33 to the end limits of the recess 26, but not enough to prevent the spring 31 slipping so as to continue driving the spanner wrench 21 until the desired torque is obtained. When the desired torque has been reached the spanner wrench 21 simply stalls out the motor 10. The air motor stalls when it has reached its capacity, and at this point the torque has reached its desired limit and switch 16 must be pressed to reverse the air motor 10 to turn counterclockwise. The capacity of the motor is established by the air pressure on the input line. This can be controlled by a pressure regulator. The counterclockwise rotation of the drive shaft 27 also rotates the member 28 in the same direction and this, in turn, rotates the spring 31 in a direction to expand the turns of the spring within the drive 29 and clutch control 32. Thus, the spring 31 drives the clutch control 32 in a counterclockwise direction until the ears 33 reach the opposite end of the recesses 26. The spring 31 is designed to frictionally lock on the clutch control 32 so that no further counterclockwise rotation is permitted and when this condition is reached the air motor 10 is stalled. Thus the air motor 10 is free to rotate the drive 28 in a clockwise direction until the required torque is supplied by the spanner wrench 21. On the other hand, the air motor is free to turn only through a limited angular degree of counterclockwise rotation as determined by the angular movement of the ears in the arcuate slots 26 so that counterclockwise rotation can take place only to the angular degree permitted and the air motor is stalled at that position.

Referring to FIGS. 4 and 5 another embodiment of the invention is illustrated using cam clutch 40 mounted in clutch housing 45 which is suitably bolted to flange 17 of motor body 2. Cam clutch 40 is any suitable commercially available shaped cam or sprag type over-running clutch. Motor drive shaft 27 is keyed at 27a (FIG. 4) to rotate wrench drive 41, and the inner race of cam clutch 40 has an interference fit on the outer side diametrically of the wrench drive 41. The outer race of clutch 40 is seated in partly fluted bore 42 of housing 45 and carries key 43 positioned in key way 44 of fluted bore 42. Cover 46 retains cam clutch 40, drive shaft 27 and wrench drive 41 assembled in housing 45.

In operation, the cam clutch embodiment depicted in FIGS. 4 and 5 operates similar to the wound spring embodiment of FIG. 2. Thus, wrench drive 41 will rotate with the drive shaft 27 through the key 27a in both directions of rotation of the shaft 27. When rotating in a clockwise direction the interference fit of the clutch 40 with the drive 41 will rotate the clutch assembly until the key 43 is against one end of the recess 44, but this will not stop the shaft 27. Accordingly, the air motor 10 will rotate shaft 27 in a clockwise direction until the torque load on the drive 41 is sufficient to stall the motor. Under counterclockwise rotation, however, the cam clutch assembly 40 will operate to lock its inner and outer moving parts together, thereby forcing the key 43 to move to the opposite end of the recess 44 where it will positively act to stop the cam clutch 40 and through this clutch to stop the drive 41. Under the latter condition the air motor 10 cannot rotate shaft 27 in a counterclockwise direction more than the length of the arcuate recess 44 will permit and when this reverse movement is used up the air motor 10 will stall.

Referring to FIGS. 6 through 11, the preferred embodiment of the invention is herein described. Clutch housing 50 is suitably bolted to flange 17 of motor body 2. The housing 50 has a bore 51 formed with circumferentially spaced bearing surfaces 51a which rotatably support a clutch adapter 53. The axial end face of the housing 50 is provided with a projecting impact tang 50a, and the adapter 53 is provided with a radially projecting impact tang 53a which is in the plane of the impact tang 50a. The housing is provided with a cover 58 having an enlarged rim 50 in which there is provided a series of apertures 60 to receive machine bolts 61 at at least four equally spaced positions relative to tapped openings in the housing 50. The cover 58 has its enlarged flange 59 substantially located in the plane of the stop tangs 50a and 53a, and a motion limiting pin 62 is fixed in the flange 59 to assume a radial position projecting inwardly and in a position at a predetermined angular spacing from the tang 50a on the housing 50. In this way the stop tang 53a on the adapter 53 is thereby trapped between the stop tang 50a and the motion limiting pin 62.

Figure 11:
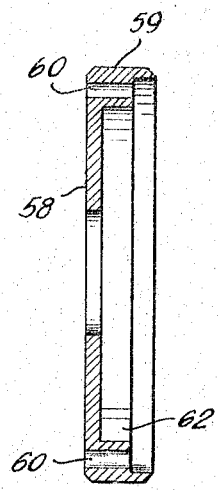
FIG. 11 is a sectional view taken along line 11—11 of FIG. 10.
Figure 8:
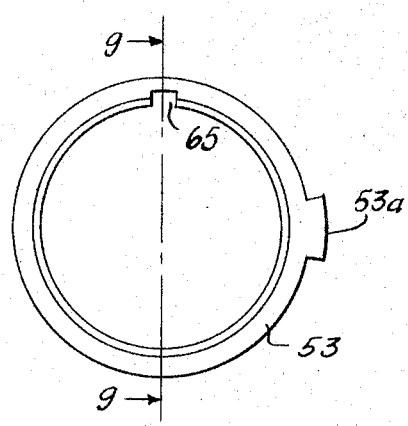
FIG. 8 is an end view of the clutch adapter depicted in FIG. 7.
Figure 9:
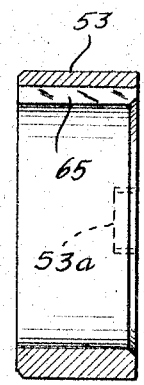
FIG. 9 is a sectional view taken along line 9—9 of FIG. 8.

Again referring to FIG. 6, it can be seen that the assembly includes a cam clutch 63 which is similar to the cam clutch 40 positioned with its inner-race mounted on the drive shaft 41 which is connected to the motor shaft 27 by a suitable key 27a. This inner-race has an interference fit on the drive shaft 41, while its outer race is connected by a key 64 to the keyway 65 formed in the adapter 53. The details of the cover 58 are shown in FIGS. 10 and 11 and it can be appreciated that by removing the bolts 61 the cover 58 may be angularly adjusted at any desired position to increase or decrease the angular spacing between the motion limiting pin 62 and the stop tang 50a on the housing 50. Bolts 61 (see FIG. 6) in some of the apertures 60 are screwed into the tapped holes in the housing, and hold cover 58 to housing 50.

In operation, the preferred embodiment of FIGS. 6 through 11 is quite similar to that of the embodiments of FIGS. 1 through 5. Hence, when the drive shaft 41 is rotated in a clockwise direction by the air motor 10 the cam clutch assembly 63 will have its inner-race rotated until the stop tang 53a on the adapter 53 is against the motion limiting pin 62. Thereafter the drive shaft 41 will rotate relative to the cam clutch assembly 63 until the desired torque delivered by the shaft 41 stops the motor 10. At this point the operator depresses switch 16 so that the air motor 10 is reversed and rotates the drive 41 in a counterclockwise direction. At this time the interference fit between the shaft 41 and the cams of the clutch assembly 63 will cause the cams to operate and lock the drive shaft 41 and the adapter 53 against relative rotation. With the drive shaft 41, the cam clutch 63, and the clutch adapter 53 that is fitted and keys 65 to the clutch 63 all locked against relative rotation the counterclockwise drive of the air motor rotates the clutch mechanism in mass until the adapter stop tang 53a is carried from the motion limiting pin 62 to the fixed stop tang 50a. At this point the air motor drive shaft is stopped. The counterclockwise angular travel of the adapter 53 and therefore drive shaft 41 depends on the angular displacement of the fixed motion limiting pin 62 from the fixed stop tang 50a.

It will be appreciated that various changes and modifications of the invention will occur to those skilled in the art, and all such changes and modifications are deemed to be within the scope of the invention which is limited solely as necessitated by the scope of the appended claims.

What is claimed is:

1. In an air operated manually controlled wrench for tightening an adjustable element to a predetermined torque and for thereafter loosening the element a predetermined amount, the combination which includes: a wrench and wrench drive shaft, an air driven motor reversibly operable; said wrench drive shaft being driven by said motor in a first direction to tighten an adjustable element and driven by said motor in a second direction reverse to said first direction; and coil spring clutch means operably connected between said air motor and drive shaft, said clutch means being constructed to allow freedom of rotation of said drive shaft in the first direction so that the tightening of the adjustable element will stall said motor, and said clutch means having means for limiting drive shaft rotation in the second direction to a predetermined amount and for stopping shaft rotation after the predetermined amount of rotation in said second direction is accomplished.

2. The wrench combination set forth in claim 1 wherein said drive shaft limiting means includes spaced stop means on said motor, a cooperating stop element in said clutch means movable in the space between said stop means, and a device responsive to drive shaft rotation in said first direction to set said stop element at one end of the space between said stop means and to cause said stop element to traverse the space between said stop means before stopping shaft rotation in the second direction.

3. The wrench combination set forth in claim 2 wherein said device is a coiled spring having its turns rectangular in section.

4. The wrench combination set forth in claim 2 wherein said space stop means on said motor are relatively adjustable to change the spacing thereof, and, hence, the amount of loosening of the adjustable element.

5. The wrench combination set forth in claim 2 wherein there is means for selecting the direction of rotation of the motor.

References Cited by the Examiner
UNITED STATES PATENTS

| | | | |
|---|---|---|---|
| 2,012,916 | 8/1935 | Pott | 81—54.51 X |
| 2,566,539 | 9/1951 | Starkey. | |
| 2,698,678 | 1/1955 | Dale et al. | |
| 3,128,864 | 4/1964 | Hungerford et al. | |

JAMES L. JONES, JR., *Primary Examiner.*